Figure 4:
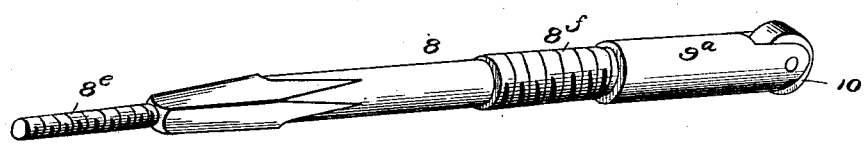

No. 755,922. PATENTED MAR. 29, 1904.
W. H. OSBORN.
WATER CLOSET.
APPLICATION FILED JULY 29, 1899.
NO MODEL. 4 SHEETS—SHEET 1.
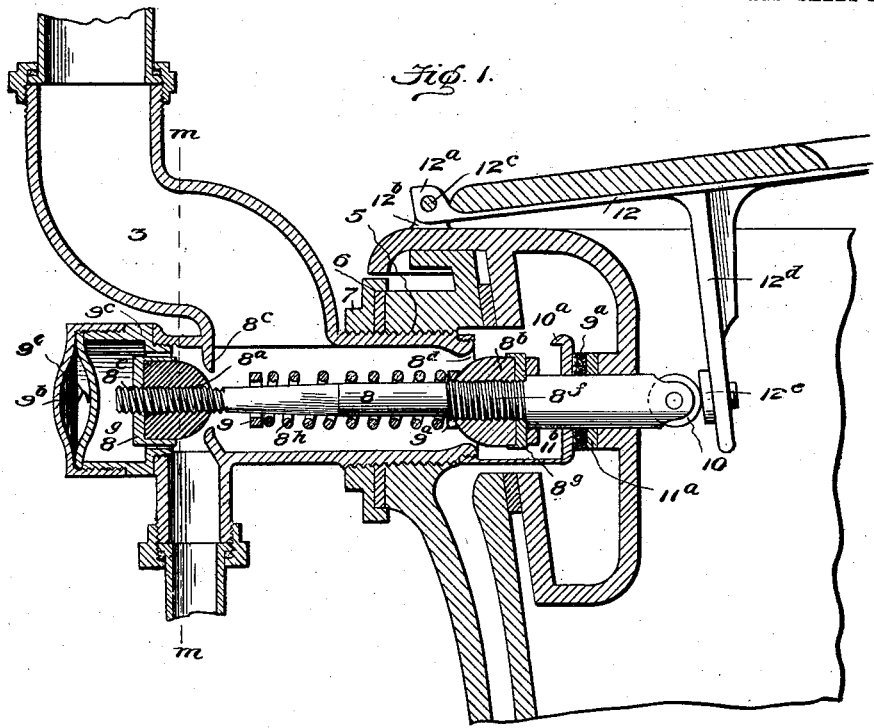
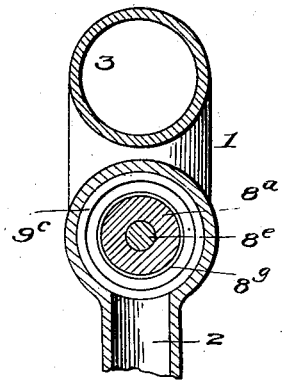
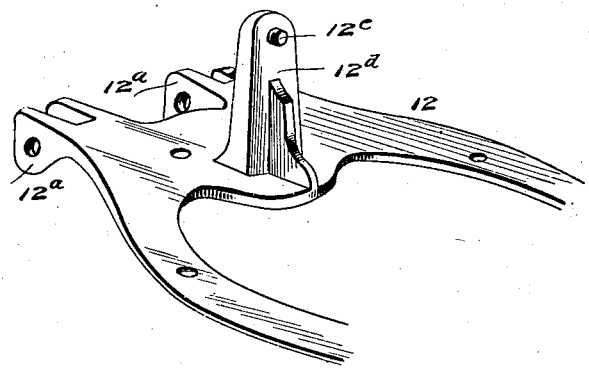
Witnesses
Inventor
William H. Osborn
By Edson Bro'
Att'ys No. 755,922. PATENTED MAR. 29, 1904.
W. H. OSBORN.
WATER CLOSET.
APPLICATION FILED JULY 29, 1899.
NO MODEL. 4 SHEETS—SHEET 2.

No. 755,922. PATENTED MAR. 29, 1904.
W. H. OSBORN.
WATER CLOSET.
APPLICATION FILED JULY 29, 1899.
NO MODEL. 4 SHEETS—SHEET 3.

Witnesses:

Inventor
William H. Osborn
By Edson Bro's
Att'ys.

No. 755,922. PATENTED MAR. 29, 1904.
W. H. OSBORN.
WATER CLOSET.
APPLICATION FILED JULY 29, 1899.
NO MODEL. 4 SHEETS—SHEET 4.
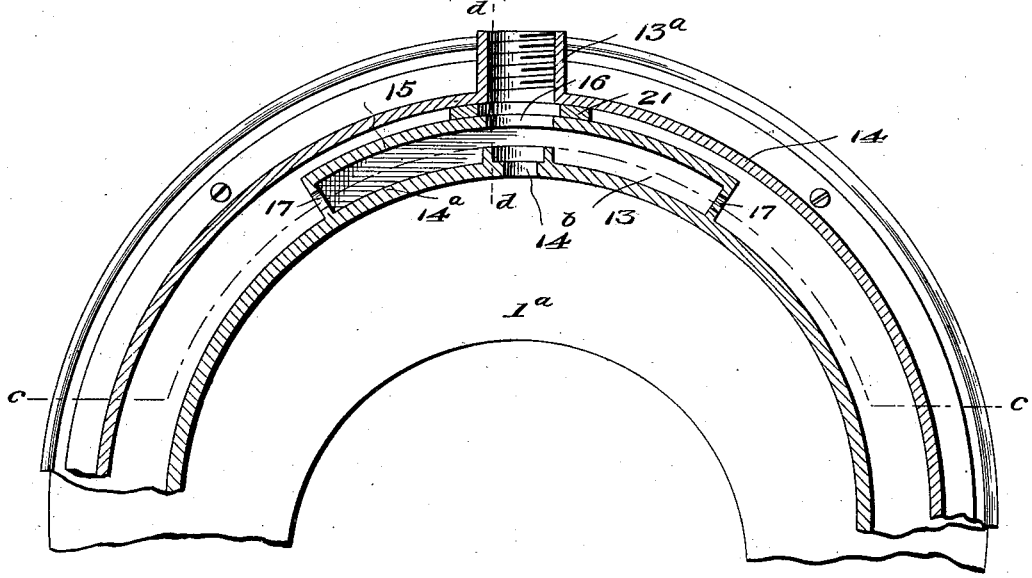
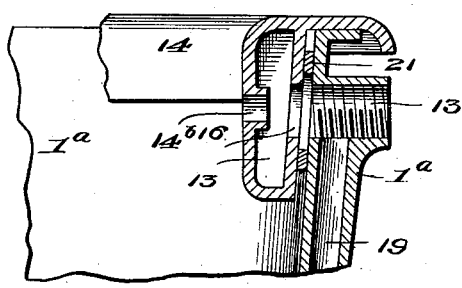
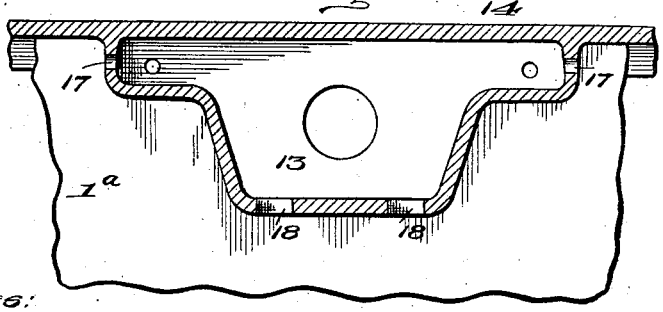
Witnesses: Inventor
William H. Osborn No. 755,922. Patented March 29, 1904.

UNITED STATES PATENT OFFICE.

WILLIAM H. OSBORN, OF LOUISVILLE, KENTUCKY.

WATER-CLOSET.

SPECIFICATION forming part of Letters Patent No. 755,922, dated March 29, 1904.

Application filed July 29, 1899. Serial No. 725,506. (No model.)

*To all whom it may concern:*

Be it known that I, WILLIAM H. OSBORN, a citizen of the United States, residing at Louisville, in the county of Jefferson and State of Kentucky, have invented certain new and useful Improvements in Water-Closets; and I do hereby declare the following to be a full, clear, and exact description of the invention, such as will enable others skilled in the art to which it appertains to make and use the same.

My invention relates to improvements in water-closet valves, more especially adapted for use in connection with the air-tight-tank type of water-closets usually supplied with water from the feed-pipe connecting with the closet-bowl, although equally applicable to other types of water-closets.

One object of the invention is to control the supply and flushing action of the water according to the pressure of the head of water; also, to facilitate the removal and renewal of the valves and to effect their ready adjustment.

A further object is to provide against the hammering action, which would otherwise arise in suddenly opening and closing the water or supply valve.

A further object of the invention is to regulate or control the pressure of the seat-arm valve-actuating device or set-screw, as may be required.

A further object of the invention is to form a water-tight joint between the valve-spindle and the flushing-rim to prevent splashing of the water at the inlet-point from the flushing-pipe to the rim.

A further object of the invention is to construct and arrange the parts of the bowl and rim to produce a water-tight compartment at the point where the valve is connected with the bowl for controlling the volume of water which may be directed either to the jet device or to the flushing-rim.

A further object of the invention is to secure a siphonic action in the closet-bowl on the depression of the seat.

Another object of my invention is to provide means which secures an equal distribution of the water for flushing the closet-bowl throughout practically the entire area thereof—that is to say, through and around the flushing-rim, over the inner surfaces of the bowl, and through the bottom part of the siphon.

A further object of the invention is to enable the flushing-rim to be assembled to the bowl, so as to secure a tight joint around the water-inlet nipple to the bowl and the supply-chamber of the flushing-rim, such joint being attained by the interposition of a washer between the bowl and rim and by the bolts which secure the rim to the bowl.

A further object I have in view is to provide improved means actuated by the seat for operating the valve and stem, which valve-operating means is controlled entirely and directly by the seat.

With these ends in view the invention consists in the novel combination of elements and in the construction and arrangements of parts, which will be hereinafter fully described and claimed.

Figure 5:
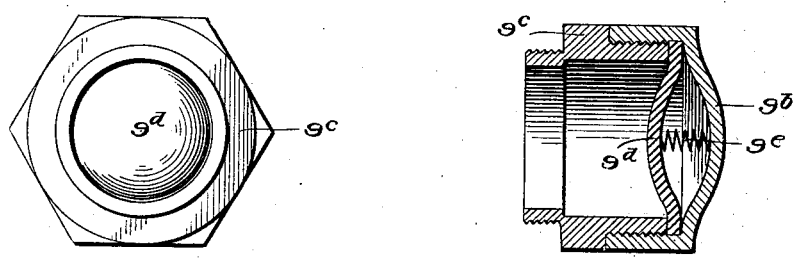
Figure 6:
Figure 7:
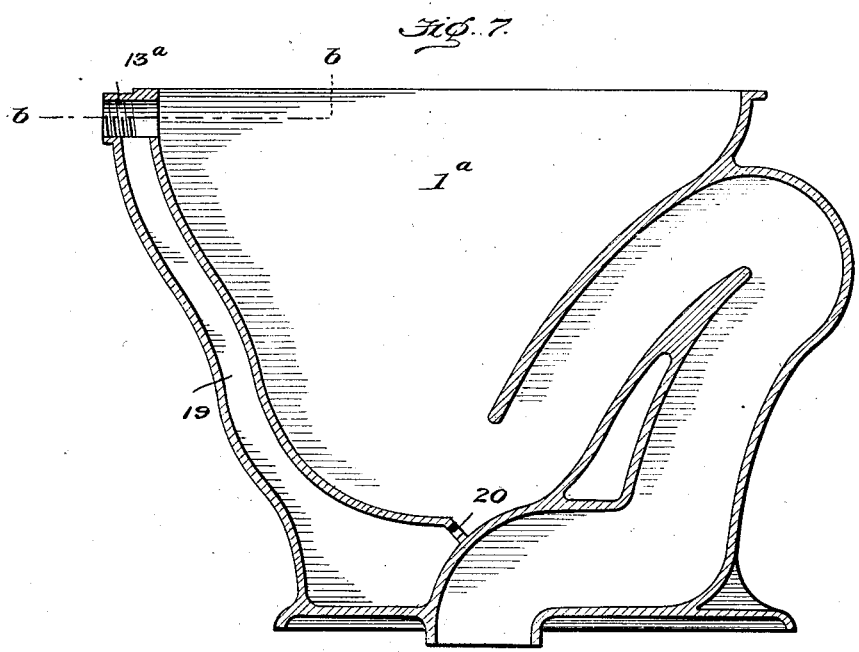
Figure 8:
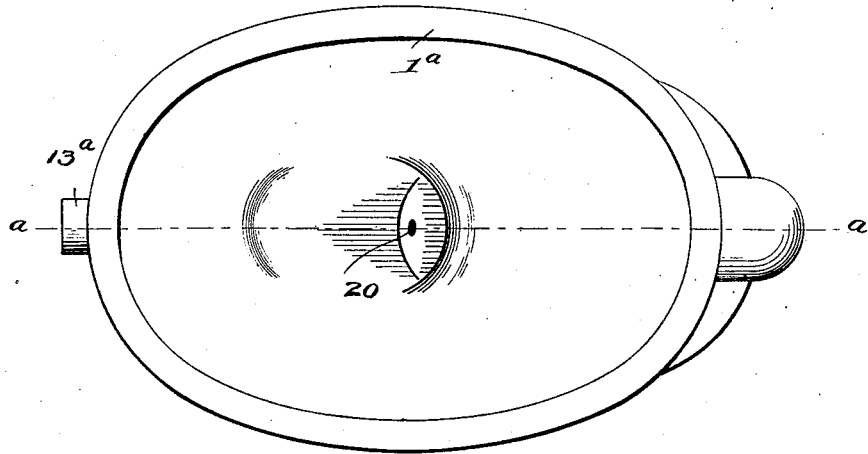

In the accompanying drawings, Figure 1 is a vertical sectional elevation of a portion of a closet-bowl and my improved valve applied thereto. Fig. 2 is a vertical cross-section on the line $m\,m$ of Fig. 1. Fig. 3 is a detail perspective view of the seat-carried casting or frame having the valve-actuating device or set-screw. Fig. 4 is a detail perspective view of the valve-stem denuded of the valves, &c. Fig. 5 is a view showing in elevation and transverse section the guide-cap for the "water-hammer" device. Fig. 6 is a view showing the two valves removed from their stem. Fig. 7 is a vertical sectional view on the plane indicated by the dotted line $a\,a$ of Fig. 8. Fig. 8 is a plan view of the bowl. Fig. 9 is a horizontal sectional view on the dotted line $d\,d$ of Fig. 7. Fig. 10 is a vertical transverse section on the dotted line $d\,d$ of Fig. 9, and Fig. 11 is a vertical sectional view on the dotted line $c\,c$ of Fig. 9.

Like numerals of reference denote corresponding parts in each of the several figures of the drawings.

1 designates the shell of the improved valve, designed to be connected to the closet-bowl, the supply-pipe from the main or tank, and the pipe from the flushing-tank. This shell is provided at the supply end with a depending nipple for the attachment of the pipe 2, supplying the water from a main or tank to said shell. Said shell has a gooseneck-like nozzle 3, to which is suitably connected a pipe leading to the flushing-tank. Said shell is coupled with the closet-bowl by screwing its inner threaded end into the bowl at 5, fitting a gasket 6 around the shell, and applying a collar 7 to said shell. A longitudinally-movable spindle or stem 8, arranged within the shell 1, is angular a portion of its length and supported to slide freely and guided in a correspondingly-shaped fixed guide 9 in said shell. One end portion of said spindle is preferably cylindrical and enlarged, as at $9^a$, and extends into the closet-bowl and carries a loosely-hung antifriction-roller 10, the function of which will appear farther on. Upon this stem or spindle are carried two valves, one being the supply or water valve $8^a$ and the other the flushing-valve $8^b$, seating in ports or seats $8^c$ $8^d$, respectively, at opposite ends of the shell-chamber, as shown in Fig. 1. Each valve $8^a$ $8^b$ consists of what I term a "fuller" ball or plug of rubber or elastic material, adapted to be screwed on threaded portions $8^e$ $8^f$, respectively, of the stem or spindle 8, and a metal cap or socket $8^g$, fitted firmly on the outer end of each fuller ball or plug and inserted upon said stem or spindle. Also arranged upon the stem or spindle 8, bearing against the fixed guide 9 and a nut $9^a$ on said spindle, respectively, is a preferably helical spring $8^h$, whose action is exerted to automatically open the flushing-valve and close the supply or water valve at the required time—i. e., after the removal of pressure from said stem at its roller end, as will be apparent hereinafter.

Upon the supply-valve end of the shell and opposite that end of the stem or spindle 8 is suitably held by a sectional or two-part screw-cap $9^b$ $9^c$ a water-hammer device comprising a flexible or rubber disk or diaphragm $9^d$, secured between the parts of sections of said cap, and a preferably coiled or helical spring $9^e$, interposed between said diaphragm or disk and one of said sections, as shown in Fig. 1. When the inlet or supply valve is suddenly closed, the high-water pressure caused by the sudden closing of the valve will be relieved by coming in contact with the disk or cushion, and the spring behind the disk or cushion will at all times keep the disk or cushion in its proper shape after the high pressure has been relieved.

A screw-cap $10^a$, adapted to be screwed upon the flushing-valve end of the shell 1, has preferably three or a series of ports through it for the passage of the water from the supply valve or chamber into the closet-chamber when the flushing-valve is opened and also serves to center the spindle or stem 8 passing therethrough and as a guide in connecting the shell to the hopper, as the shell is required to be screwed or inserted into the hopper just a certain or predetermined distance. The spindle or stem 8 is suitably packed where it passes through said cap $10^a$ by preferably a flexible or soft-leather washer $11^a$ and wicking or fibrous material $11^b$ sandwiched between said washer and cap, said washer coming in contact with the flushing-rim of the closet bowl or hopper, and thus tightly packing said fibrous or wicking material against said cap, preventing any possible leakage or spraying of water around said stem or spindle.

It will be observed that by the use of the adjustable supply and flushing valves, as above described, either can be screwed or adjusted along the stem or spindle 8 to any predetermined or required point with relation to its seat or port, according to the pressure of the head of water on, especially as found necessary in the use of air-tight or iron tanks, and thus regulate or control the supply and flushing action of said valves, preventing the excessive flow of water into the closet-bowl and the splashing of the same out of the latter. Also by this arrangement the valves can be readily adjusted, as is obvious, so as to increase the discharging capacity of said valves, as required under a low pressure or head of water to increase the otherwise reduced flushing action of the water passing by the flushing-valve under such conditions.

A flat annular or ring-like casting 12 is suitably secured by screws or other fastenings to the under side of the seat 13 and is adapted to form the hinge connection between said seat and the closet-bowl or flushing-rim, said ring or casting having preferably formed therewith parallel ears or sockets $12^a$ $12^a$ beyond the rear edge of said seat, and said flushing-rim having parallel upstanding apertured lugs $12^b$ $12^b$ adapted to enter said ears, and through these lugs and ears is inserted a pintle or nutted and headed rod $12^c$, hinging or pivotally connecting them together.

The ring or casting 12 is provided with a pendant or arm $12^d$, preferably integral therewith and arranged to stand in alinement with the valve stem or spindle 8, and is provided with a preferably flat headed or shouldered set-screw $12^e$, adapted to engage or contact with the roller 10 to actuate said stem or spindle in closing the flushing-valve and opening the supply or water valve as the seat is depressed or sat upon to supply the tank with water, the same also filling the valve-shell, so that as pressure is removed from the seat the supply-valve will be closed and the flushing-valve opened by the action of the spring $8^h$, thus properly flushing the bowl and stopping off the supply of water at the water or supply valve. It will be observed that by the use of the set-screw, the same permitting of its relative adjustment to the valve stem or spindle 8, the seat can be caused to rest flush or flat down on the flushing-rim or bowl and be free from all strain, while just sufficient pressure is exerted as the seat is depressed or sat upon through the same upon the flushing-valve to cut off the flow of the water to the bowl and also relieve the valve of undue strain or any more than necessary for that purpose.

My improved construction of the valve provides means by which a siphonic action in the gooseneck-valve may be established when the seat is occupied. The water passing through the flushing-valve enters the closet-bowl, in turn causing a siphonic action in the gooseneck-valve shell, siphoning water out of the bowl.

One of the leading features of my invention consists in the employment of a supply-chamber 13 on the flushing-rim 14 of the closet. This rim is shown clearly by Figs. 9 to 11, inclusive, of the drawings. It is a continuous cast-metal piece conforming to the shape of the upper edge of the closet-bowl $1^a$, and at its rear side, adjacent to a water-inlet nipple $13^a$, the flange $14^a$ of the rim is provided with a curved wall 15, which is parallel to the rim and to the closet bowl and is joined by flanges or walls to the flushing-rim, so as to provide the chamber 13. This supply-chamber 13 lies between the bowl and the flange of the flushing-rim, and, as heretofore described, the flange $14^a$ of the rim 14 has the opening $14^b$ to accommodate the valve-stem. The rear wall 15 of the flushing-rim has an enlarged opening 16, which is coincident or in alinement with the opening $14^b$ and the water-nipple, and thus the valve-stem is free to play in the openings 16 and the nipple. The supply-chamber 13 is of considerable area to insure a proper quantity of water being supplied to the flushing-rim and the bowl, and the discharge of the water to the bowl and rim 14 is effected through ports which lead from the ends and bottom of said chamber 13. The ports 17 are formed in the end walls of flanges of the chamber 13 to discharge directly in the space inclosed between the flushing-rim and the bowl, and the ports 18 open downwardly through the bottom of the chamber 13 to direct water against the inner surface of the bowl at the rear side thereof. I also construct the bowl with a conduit or passage 19, which is formed on the rear side of the bowl. This conduit opens at its upper end into the water-nipple to receive water therefrom when the valve is opened and the closet flushed, and the lower end of this conduit extends to the bottom of the bowl and discharges to a port 20 in a depression at the bottom of the bowl, so as to discharge water into the siphon and assist the siphonic action of the closet in carrying off the contents of the bowl.

It will be seen that I have provided an improved construction of the closet-bowl in which water is supplied from a single chamber to the flushing-rim and the bowl and by a conduit to the foot of the bowl, thus providing a single source of water-supply to three several parts of the closet.

To secure a tight joint around the water-inlet from the closet-nipple to the supply-chamber of the flushing-rim, I employ a gasket 21, which is interposed between the rear wall of the chamber 13 and the closet. The gasket surrounds the passage from the closet-nipple to the chamber, as shown by Figs. 9 and 10, and it is clamped in place between the wall 15 and the bowl when the flushing-rim is secured by bolts or screws to the closet.

It is evident that slight changes in the form and proportion of parts and in the detailed construction may be made without departing from the spirit or sacrificing the advantages of my invention.

Having thus fully described my invention, what I therefore claim as new, and desire to secure by Letters Patent thereon, is—

1. In a water-closet, having a bowl of the siphon-jet type, the combination with said bowl of a detachable distributing-chamber sealed to the inner wall of the bowl over the inlet-opening, and a communication between said distributing-chamber and the siphon-conduit, substantially as specified.

2. In a water-closet, having a bowl, of the siphon-jet type, the combination with said bowl of a hollow distributing-chamber secured on its inner rear wall and sealed thereto by an interposed gasket; an inlet-opening in the rear wall of said distributing-chamber, adapted to register with the inlet-opening of the bowl; an opening in the front wall of the said distributing-chamber, in alinement with the aforesaid inlet-opening and adapted to receive a packed valve-rod; a double-acting, automatic flushing-valve; ports in the bottom edge of said distributing-chamber, and ports in the lateral edges of the same, said ports being of such minitude as to project the water issuing therefrom around the edge of the bowl, and also to force a portion of the water from the supply-chamber into the siphon-conduit, substantially as specified.

3. In a water-closet, having a double-acting automatic flushing-valve, in said flushing-valve, the following combination: a cylindrical valve-shell, having one end flared to form a valve-seat and externally and suitably threaded to be screwed into the supply-opening of the bowl, the opposite end chambered so as to accommodate and form the body of a water-cushion chamber and externally threaded to receive a cap, and at the inner end of the water-cushion chamber an integral supply-port and valve-seat; a packed and threaded valve-rod disposed and operating axially in aforesaid valve-shell; a stationary valve on and adjacent to the packed end of said valve-rod, and an adjustable valve on the end of said valve-rod adjacent to the water-cushion chamber; and a spiral spring on said valve-rod operating between said valves, substantially as and for the purposes specified.

4. In a water-closet, having a bowl and a hinged seat, the combination of an annular rim covering the upper edge of the bowl, having an integral distributing-chamber, and hinge-lugs for the seat-hinge integral with said rim, substantially as specified.

5. In a water-closet, having a bowl and a hinged seat, the combination of a distributing-chamber with an integral flushing-rim, said distributing-chamber secured to the inner wall of the bowl over the supply-opening, a packed valve-rod protruding into the bowl from said distributing-chamber, a pendant or lever integral with the hinge-lugs of said hinged seat and so disposed that its lower end is in proximity with said valve-rod, and an adjustable wear-plate on the lower end of said pendant or lever so disposed as to press upon and work against an antifriction-roller in the exposed end of said valve-rod, substantially as specified.

6. The combination in a water-closet, of a bowl, a detachable flushing-rim and integral distributing-chamber, an automatic flushing-valve with stem protruding from said distributing-chamber, integral hinge-lugs on said flushing-rim, a hinged seat, and a pendant or lever integral with the hinge-lugs of said hinged seat and so disposed as to depend into the bowl into proximity with the said protruding valve-stem, substantially as specified.

7. In a water-closet, the following combination: a bowl with a threaded supply-nipple; a siphon-jet conduit in said bowl; a rim of curved cross-section covering the upper edge of the bowl; a distributing-chamber sealed to the inside of the rear wall of the bowl, and communicating with the siphon-jet conduit, and with the supply-opening in the bowl; a double-acting combined flushing-valve and water-cushion; hinge-lugs integral with the above-mentioned rim; a seat hinge-plate having integral hinge-lugs and valve-operating pendant; and an adjustable and renewable wear-plate on the lower end of said operating-pendant, substantially as specified.

8. The combination, of a closet-bowl, a water-supply nipple applied thereto, a flushing-rim secured to the bowl and having a supply-chamber provided in its back wall with an inlet-opening in communication with said water-supply nipple and having integral extensions with discharge ports or openings in their extremities, and a downward extension with discharge ports or openings in its bottom, said supply-chamber being of extended lateral area and depth as relates to the inlet-opening, and a gasket interposed between said bowl and chamber, substantially as set forth.

9. The combination with a bowl, and a supply-nipple thereto, of a flushing-rim secured to the bowl and having a supply-chamber provided on its back wall with an inlet-opening, and a gasket interposed between the rear wall of the chamber to be clamped in place between said bowl and said rear wall of said supply-chamber, substantially as described.

10. The combination with a bowl, and a supply-nipple thereto, of a flushing-rim secured to the bowl and having a supply-chamber provided on its back wall with an inlet-opening, a gasket interposed between the rear wall of the chamber to be clamped in place between said bowl and said rear wall of said supply-chamber, and a gasket interposed between the upper surface of said bowl and said flushing-rim, substantially as specified.

11. The combination of the closet-bowl having the water-supply nipple and the conduit or passage 19 with the port 20 at the bottom of the bowl; the flushing-rim adapted to be secured to the bowl and having the supply-chamber 13 communicating with the supply-nipple of the bowl; the valve-shell 1, communicating with the said supply-nipple and having the valve-seats $8^c$, $8^d$, the supply pipe or opening 2, and the flushing-nozzle 3; the valve-stem 8 in said valve-shell and having the valves $8^a$, $8^b$, for the purpose set forth, and means to operate said valve-stem, substantially as described.

In testimony whereof I affix my signature in presence of two witnesses.

WILLIAM H. OSBORN.

Witnesses:
WM. B. EAGLES,
H. C. STRAUS.